May 29, 1962 R. K. ANDERSON 3,036,468
WHEEL BALANCING DEVICE
Filed Feb. 11, 1958 2 Sheets-Sheet 1

Richard K. Anderson
INVENTOR.

BY *Clarence A. O'Brien*
*and Harvey B. Jacobson*
Attorneys

May 29, 1962 R. K. ANDERSON 3,036,468
WHEEL BALANCING DEVICE
Filed Feb. 11, 1958 2 Sheets-Sheet 2
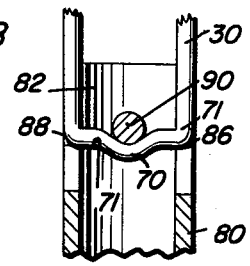
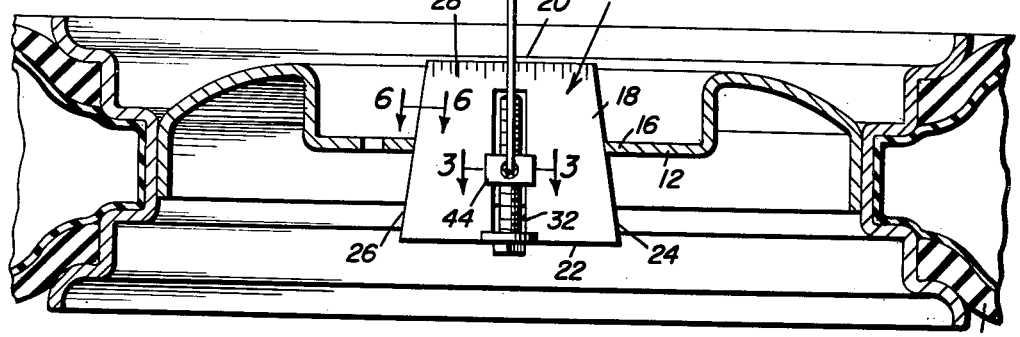
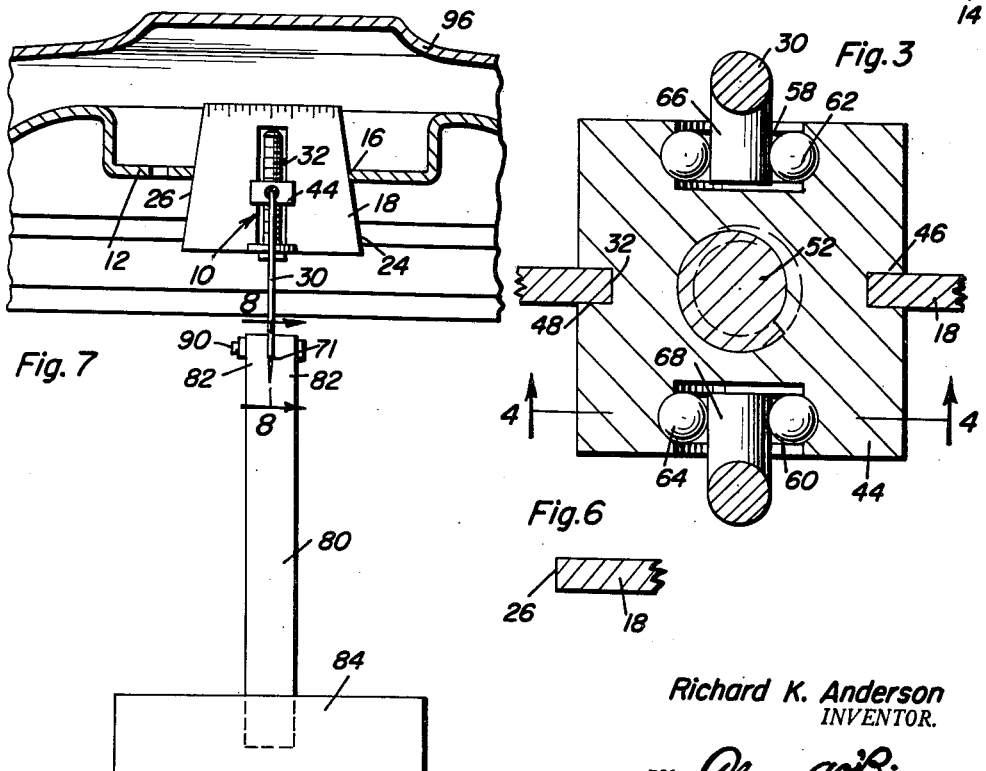
Richard K. Anderson
INVENTOR.
BY *Clarence A. O'Brien*
*and Harvey B. Jackson*
Attorneys

United States Patent Office 3,036,468
Patented May 29, 1962

3,036,468
WHEEL BALANCING DEVICE
Richard K. Anderson, Alliance, Ohio (R.D. 1, North Benton, Ohio), assignor of one-half to William E. Edwards, Alliance, Ohio
Filed Feb. 11, 1958, Ser. No. 714,521
6 Claims. (Cl. 73—486)

This invention relates to a wheel balancing device and more particularly to a wheel balancing device which is capable of being operated very rapidly and with sufficient accuracy.

An object of the invention is to provide a wheel balancer for motor vehicle wheels, wherein the balancer is of exceedingly simple construction but capable of accurate measurement for out of balance conditions, avoiding a considerable amount of routine necessary in presently available instruments for measuring wheel unbalance.

Other objects and features of importance will become apparent in following the description of the illustrated forms of the invention.

FIGURE 2 is a transverse sectional view of the wheel on the balancer in FIGURE 1;

FIGURE 3 is an enlarged fragmentary sectional view taken on the line 3—3 of FIGURE 2 and in a direction of the arrows;

FIGURE 6 is an enlarged sectional view taken on the line 6—6 of FIGURE 2 and showing the sharp precision edge of the wheel supporting balancer plate;

FIGURE 7 is an elevational view of a modification of the invention showing the parts of FIGURE 5 being used in a different orientation whereby a wheel may be balanced with its cover; and FIGURE 8 is a sectional view taken on the line 8—8 of FIGURE 7 and on enlarged scale.

Figure 1:
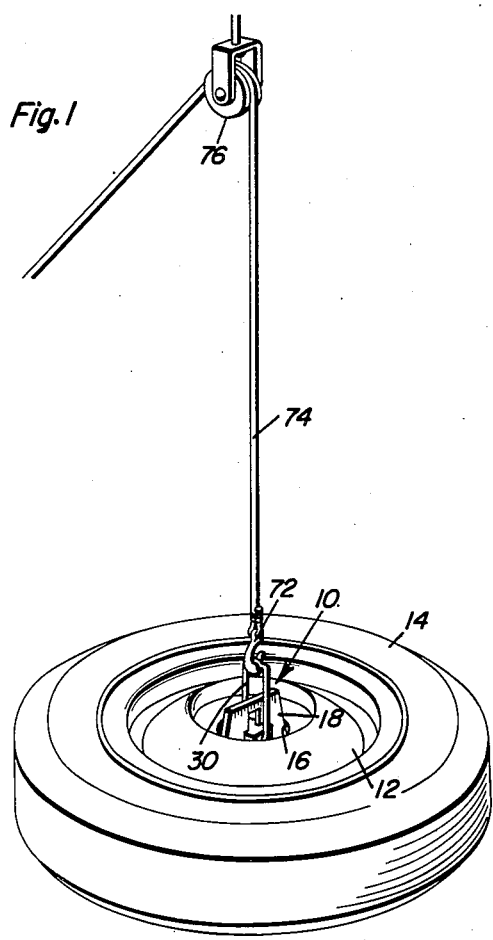
FIGURE 1 is a perspective view of my wheel balancer showing the same in use.
Figure 4:
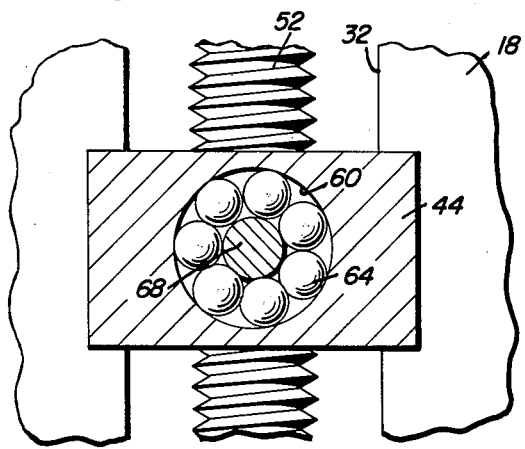
FIGURE 4 is an enlarged sectional view taken on the line 4—4 of FIGURE 3 and showing the high grade bearings used to establish an axis of rotation for the balancer in the wheel balancing operation.
Figure 5:
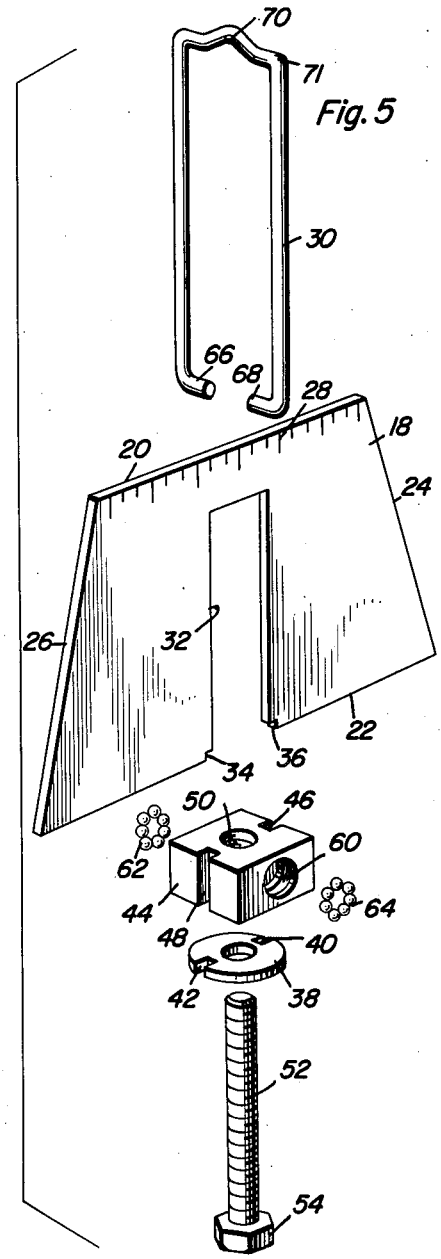
FIGURE 5 is an exploded perspective view of the balancer.

In the accompanying drawings there is a balancer 10 which is constructed in accordance with the principles of the invention. This balancer is used with a wheel 12 on which there is a tire 14, the wheel and tire typifying any passenger or truck wheel and tire or for that matter, any wheel and tire whether it is used as a part of a motor vehicle or in some other capacity. Wheel 12 has a central opening which is common to most wheels. This central opening 16 is used for the wheel balancing operation.

Balancer 10 is made of a wheel supporting plate 18 of trapezoidal shape having upper and lower parallel edges 20 and 22 respectively and edges 24 and 26 on the sides thereof which are inclined toward each other and toward the shorter edge 20. Graduations 28 in the form of notches, scribe markings or other means of indication are along the edge 20 to coact with the hanger 30 in determining the unbalance, if any, of the instrument.

An elongate slot 32 is formed in plate 18 and opens through the edge 22. Shoulders 34 and 36 are formed at the ends of the sides of the slot 32 and they accommodate washer 38 that has peripheral notches 40 and 42 which nest in notches 34 and 36. Nut 44 slides into the elongate slot 32 and has tracks 46 and 48 in its sides that ride on the edges of elongate slot 32. The threaded bore 50 of nut 44 accommodates bolt 52 whose head 54 bears against the washer 38. Laterally opening bores 58 and 60 are in the sides of nut 44 opposite those sides that have tracks 46 and 48 (FIGURE 3). High quality bearings, for example ball bearings 62 and 64 are in the bores 60 and 58 and they accommodate trunnions 66 and 68 formed at the lower extremities of the otherwise U-shaped hanger 30. A slight depression 70 is formed in the top of the hanger 30 in order to center the hook 72.

Hook 72 constitutes a part of the means for using the wheel balancer. A rope 74, cable or the like is attached to the hook 72 (or tied directly to the balancer) and is entrained over an overhead guide, for example, pulley 76.

It is of noted importance that the edges 24 and 26 (FIGURE 6) of the wheel supporting plate 18 be machined or otherwise formed true. This is so that the wheel 12 is supported evenly and correctly during the entire wheel balancing operation.

Attention is now invited to FIGURES 7 and 8. Wheel balancer 10 is used in another position. Stand 80 consists of a post or other support having jaws 82 at its upper extremity. The lower extremity of the post may be mounted in any fashion. For example it may be clamped between the jaws of a vise 84 or may be bolted to the floor or in some other way supported in an upright position. The jaws 82 have shoulders 86 and 88 on which the end 71 of the hanger 30 is seated but in an inverted position. Bolt 90 is passed through jaws 82 in order to clamp the hanger 30 in a firm, upright position. The plate 18 is arranged to support wheel 12 on the balancer supported from below rather than supported from an overhead position. After balancing the wheel by sampling along different axes and adding weights where necessary, the wheel cover 96 is placed on the wheel in the position that it will ordinarily occupy. Then the wheel is again balanced with weights being added as required. Hence, the wheel plus its cover are balanced to obtain absolutely correct results rather than relying on the sometimes false assumption that the wheel cover unbalance does not exist or is inconsequential.

In using the device, the bolt 52 is first adjusted to run the nut 44 up or down so that the desired relationship between the center of gravity of the wheel and the point of support of that wheel are obtained. The sensitivity of the wheel balancer is governed in this way. After a brief trial period the balancer is easily adjusted to the correct and reasonable sensitivity level. Thereafter samplings along various axes are taken by moving the wheel 12 with respect to the plate 18 of the balancer whether used as in FIGURE 1 or as in FIGURE 7. With the addition of weights where found necessary, the balance condition of the wheel is obtained.

The wheel 12 to be balanced is first removed from the vehicle, cleaned, and then positioned with the outside of the tire 14 facing upwardly. The orientation of the tire with respect to the floor or other supporting surface is unchanged from this point on until the balancing of the wheel is completed.

The balancer is inserted from underneath the tire and then the tire is placed downwardly in its original position. The hanger 70 is then attached to a rope, cable or the like 74 which is run through a pulley 76 mounted overhead in such a way that the operator can easily lift the wheel by exerting a pull on the end of the rope. The sensitivity required for a particular job will depend on the degree of accuracy required or desired. Therefore the preferred embodiment of the invention will have a nut 44 containing ball bearings 62 and 64 that will initially be positioned near the top of the wheel supporting plate and gradually worked downwardly toward the center of gravity of the wheel until the required amount of deflection is obtained. This required amount of deflection may be such that one (1) ounce of weight when laid on the rim of the wheel will effect an angular deflection in the order of 30 to 40 degrees. The operator merely works the nut downwardly until he can place an ounce weight on the rim of the wheel and thereby obtain the required deflection. He will simply then remove the weight, since he now knows the balancer is adjusted for the particular wheel, and then proceeds to balance the wheel. During the remainder of the balancing the operator will maintain the notches 28 of the balancer facing him.

The determination of balancer error caused by manufacturing inaccuracies is realistically coped with by the invention. With a slight pressure exerted by the supporting rope, the balancer plate 18 is centered within the hole by alternately exerting forces in both directions perpendicular to the plate until the plate is worked up into the hole as far as possible. This will tend to center the plate since the farther the plate can be worked up into the hole, the more nearly centered it must be. The positioning of the wheel on a relatively level surface and as nearly under the overhead pulley 76 as is possible is essential to this centering process. Effort should be made to hold the balancer plate center notch 32 directly between the arms of the hanger 30 as the tension increases and the balancer lifts the wheel from the floor. The sharp edges 24 and 26 of the plate tend to prevent the wheel from tilting to the right or the left of the plate unless serious unbalance exists in one of these directions. In the event the wheel tips to the right or to the left of the plate upon initial lifting, the plate should be reoriented by approximately 90 degrees or until the new orientation of the balancer permits the unbalanced portion of the wheel to result in a deflection about the axis of the balancer. When the most heavy portion of the wheel has been located and the previously mentioned nut position adjusted so that a suitable amount of deflection is produced by the unbalance, weights may be placed about the rim of the wheel until the wheel is no longer tilted. In the event the addition of new weights does not set the wheel into pivotal deflecting motion, the sensitivity should be adjusted again or the wheel should be set into motion to overcome the effects of friction, whichever seems logical because lightly loaded balance bearing friction is negligible. This motion may be imparted by merely downwardly displacing one side of the wheel from the plane of the plate and then releasing it to cause a slight rocking motion. The tension on the rope is released to permit the wheel to come to rest on the floor. After carefully noticing the orientation of the plate with respect to the wheel, the operator walks around the wheel to its other side and then moves the plate until the notched side of the plate faces the operator. The wheel will then remain oriented as before. Then the same procedure as described previously should be followed. Accordingly, the wheel is again supported and by centering the plate in the hole of the wheel, and a horizontal balance position is obtained, without disturbing the previously added weights. Once this position is obtained, the wheel is balanced about the axis of the balancer in a direction aligned with the operator and the operator has only to reorientate the balancer in several different positions, approximately 45 degrees orientation each time, to completely balance the wheel.

The operator should start the job of completing the balancing by changing the orientation of the plate by 45 degrees and then seeking the horizontal position. Should the wheel tip from the horizontal, a weight is needed to offset unbalance in the wheel in this new position. Should tilting occur after reorientation by 180 degrees, the operator should proceed to note the amount of deflection obtained in the second position by counting the number of notches from the center of the notch directly between the arms of the hanger. The number of notches is determined by two cases: Case I. Wheel unbalance is either non-existent, i.e., the wheel was balanced upon initial lifting and no weights were added, or the unbalance has been compensated for by the addition of weights. If the balancer were accurate and without error in manufacture there will be no notches counted and the center notch of the plate will come to rest directly between the arms of the hanger as in the initial position of the balancer.

Case II. Wheel balance condition as in case I, with balancer introducing error. In this case the error of the balancer will result in a deflection and therefore notches can be counted between the center notch and the arms of the hanger. This number of notches should be divided by two (2) and the answer should be added or subtracted as deviations from the initial level position in the balanced state since the error in the balancer actually means that a balanced wheel does not hang level but will tilt at some slight angle proportionate to the amount of error. If the deflection is clockwise in the second position, say two (2) notches, this should indicate that the balanced position would be one notch clockwise in the original position. In the event the deflection is counterclockwise, say two (2) notches, this would indicate that the balanced position should be one (1) notch counterclockwise in the original position. An easy check is made by trying the above, i.e., repositioning the balancer to the initial position, cause tilting thereof by adding or subtracting weight as the case requires, until the deflection is such as above prescribed for the initial position. Then with this new amount of weight the wheel would be balanced after which the balancer should be reorientated 180 degrees and the number of notches in the same direction, clockwise, or counterclockwise, determined.

The operator permanently notes this number since this represents the balanced position for his particular instrument. The operator then orients the plate approximately 45 degrees as described previously and proceeds to balance the wheel, each time striving for the amount of deflection which has been found to represent the balanced position with the notches side facing him. This check for balancer error need never be repeated since it will never change and of course would apply to any and all wheels.

From the foregoing, it will be apparent that the balancer operates satisfactorily without high speed wheel rotation equipment inasmuch as the wheel approaches a disc in physical configuration, or two discs as some may look at it, and the formulas for static balancing and for dynamic balancing are identical for a disc.

In the event that large wheel covers are used, they may be a source of unbalance when mounted on the wheel and this unbalance must be compensated for. To my knowledge there is no balancer commercially available which is capable of balancing wheels that have the wheel covers on them. Accordingly, the balancer may be arranged as indicated in FIGURE 7 and operated with the wheel cover 96 after the wheel has been completely balanced very accurately as outlined hereinbefore. The balancer is removed from the overhead support and remounted in the mounting fixture 80 which is seated or held by a base 84, for example, a vise. Care is exercised when the bolt 90 is inserted in the mounting fixture so that the arms are not squeezed together which would cause friction between the arms and the nut. The plate should be tested to turn freely after the mounting fixture bolt 90 is firmly tightened.

Then the wheel is placed carefully on the balancer by forcing the plate 18 into the center hole until the balanced position is obtained. Then the wheel cover is placed on the wheel and moved clockwise or counterclockwise until a deflection is noted. It may be necessary to increase the sensitivity of the balancer at this time. When the maximum deflection has been obtained by moving the wheel cover, the section of the wheel cover 96 which is on the low side is heavier and weights may be added, as previously described about the rim of the wheel until the balance has been corrected. This weight represents the unbalance of the wheel cover and the weight must be added to the rim when the wheel cover is properly positioned on the wheel; that is, when the valve stem is located in the hole provided for it in the wheel cover. It would be advantageous at this point to add the weight to the wheel cover if practical, so as not to disturb the balance when the cover is removed and replaced.

It is understood that various changes and modifications may be made without departing from the claimed invention.

What is claimed as new is as follows:

1. A wheel balancing apparatus for wheels having a central hole comprising, a single plate member having tapered side edges for extending through said central hole for supporting the wheel on the plate member at selected orientations of said wheel with respect to the plate member, tilting axis means adjustably mounted on said plate member, mounting means pivotally connected to said tilting axis means for establishing with said axis means a tilting axis for the plate member and wheel, sensitivity adjustment means operatively connected to said plate member and tilting axis means for adjustably positioning the tilting axis means on the plate member, said plate member including balance indicating edge means, and indicator means on said mounting means with respect to which said edge means is movable in response to unbalance of the wheel for indicating unbalance of the wheel.

2. The apparatus as defined in claim 1, wherein said edge means comprises a scale mounted at a top edge of said plate member for quantitive determination of unbalance, said mounting means being suspended from above the wheel for balancing the wheel without a wheel cover.

3. The apparatus as defined in claim 1, wherein said mounting means includes a vertical supporting base for supporting the wheel from below to balance the wheel with a wheel cover.

4. The combination of claim 1, wherein said sensitivity adjustment means includes a bolt, an elongated slot in the plate member for slidably receiving said tilting axis means, said tilting axis means comprising a nut threadedly mounted on said bolt and having tracks on opposite edges, and two edges of said slots being nested in said tracks to constrain movement of said nut with respect to said plate member.

5. The combination of claim 4, wherein said bolt has a washer thereon, said elongated slot having shoulders at its outer end accommodating said washer whereby said washer functions as a thrust element for said bolt.

6. The combination of claim 5 wherein said mounting means includes a hanger having trunnions at its extremity, bearings carried by said nut, said trunnions being mounted for rotation in said bearings.

References Cited in the file of this patent

UNITED STATES PATENTS

| | | |
|---|---|---|
| 710,148 | Hodgkinson | Sept. 30, 1902 |
| 2,461,591 | Currier | Feb. 15, 1949 |
| 2,481,256 | Sutton | Sept. 6, 1949 |
| 2,592,804 | Holl | Apr. 15, 1952 |
| 2,647,398 | Marvel | Aug. 4, 1953 |
| 2,698,537 | Taylor et al. | Jan. 4, 1955 |
| 2,720,110 | Lucht | Oct. 11, 1955 |
| 2,919,582 | Riedel | Jan. 5, 1960 |